D. M. GATES.
GRUBBING AND ROOT BREAKING MACHINE.
APPLICATION FILED DEC. 10, 1908.
922,572.
Patented May 25, 1909.
2 SHEETS—SHEET 2.
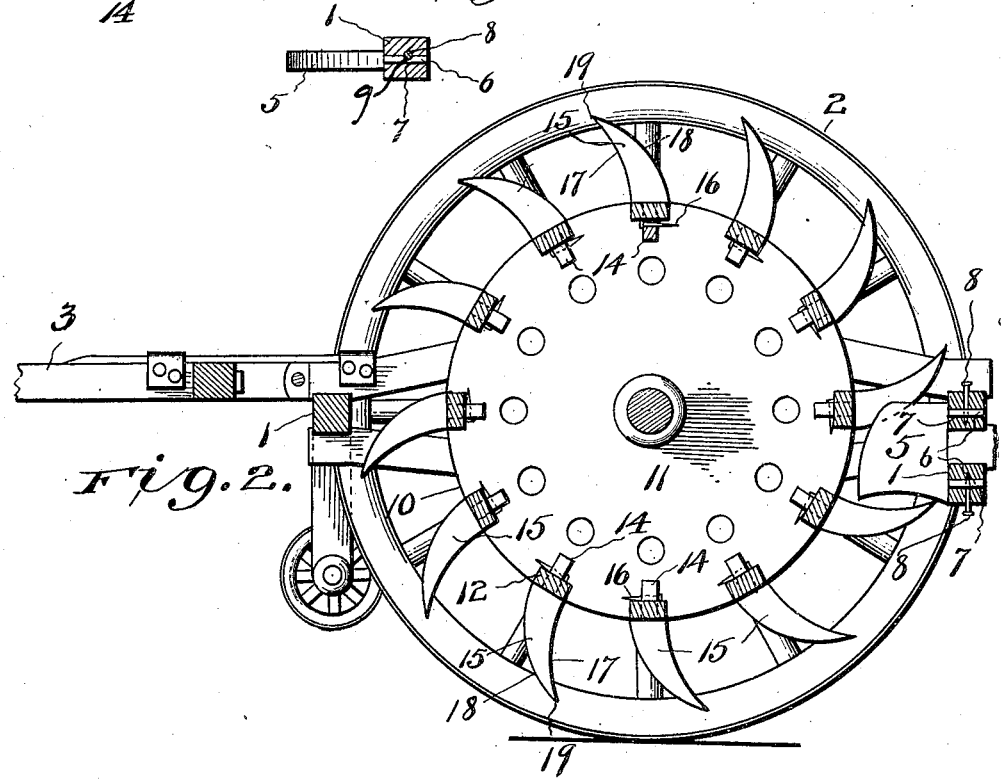

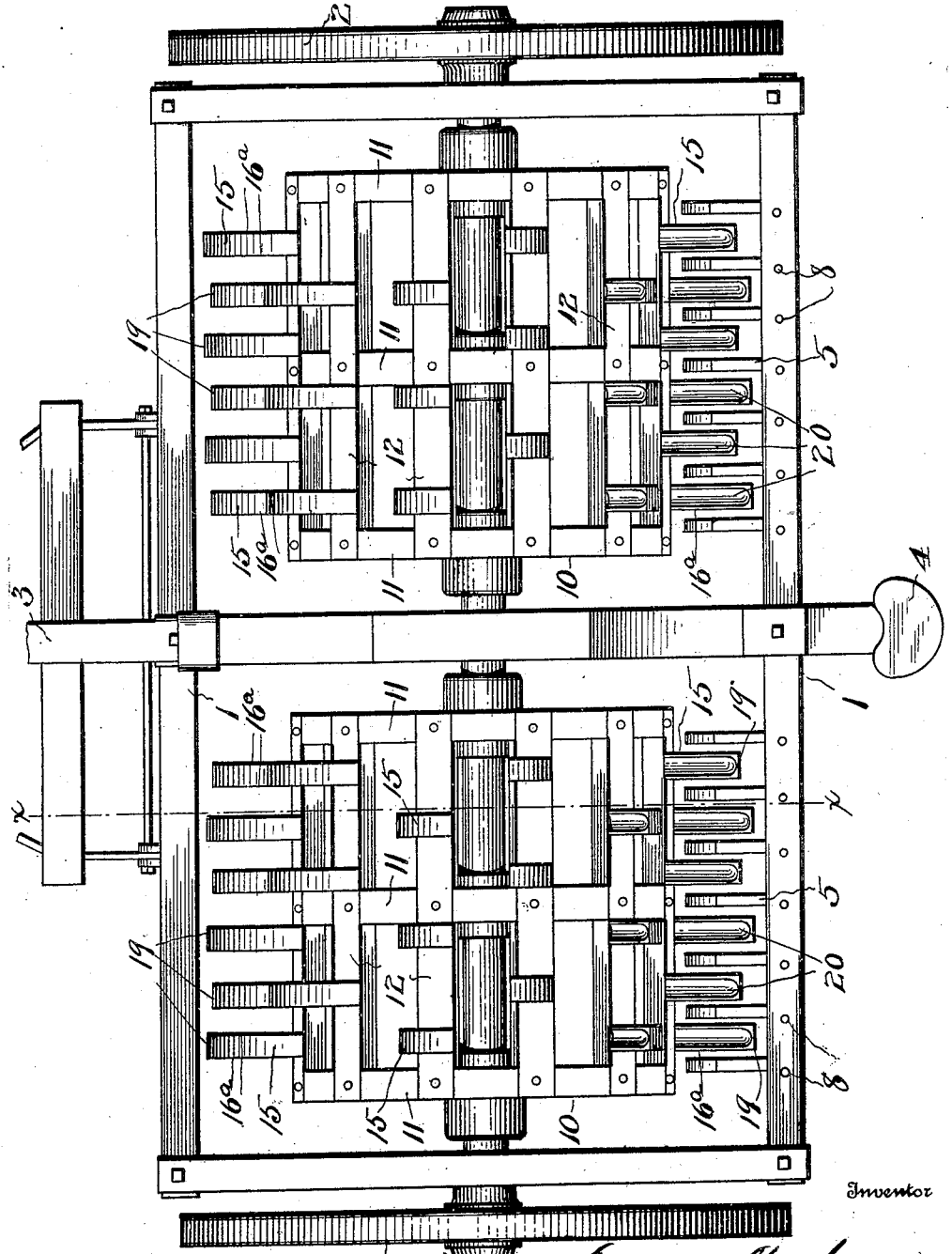

UNITED STATES PATENT OFFICE.

DAVID M. GATES, OF CROSS TIMBERS, MISSOURI.

GRUBBING AND ROOT-BREAKING MACHINE.

No. 922,572.  Specification of Letters Patent.  Patented May 25, 1909.

Application filed December 10, 1908. Serial No. 466,880.

*To all whom it may concern:*

Be it known that I, DAVID M. GATES, a citizen of the United States, residing at Cross Timbers, in the county of Hickory and State of Missouri, have invented certain new and useful Improvements in Grubbing and Root-Breaking Machines, of which the following is a specification.

My invention relates to devices used to break up and prepare new land for cultivation, and has for its object the provision of a wheeled frame having rollers journaled therein consisting of disks with cross-beams secured thereto and having holes therein in which are secured teeth by means of their shanks engaging said holes, and secured therein by transverse pins secured through said shanks. The teeth are formed with concave and grooved faces to act as shovels to lift clods, roots, etc., into engagement with the blades secured to the frame, and positioned to pass between the teeth on the rollers, which assist in breaking up the clods or cutting the roots, sprouts, etc., into short lengths.

The construction and operation of my improved machine will be described in detail hereinafter and illustrated in the accompanying drawings, in which—

Figure 1 is a plan view of my improved grubbing and root breaking machine, Fig. 2, a cross section on the line x—x of Fig. 1, Figs. 3 and 4, views of the cultivator teeth, and Fig. 5 is a top edge view of one of the cutting blades.

In the drawings similar reference characters indicate corresponding parts throughout the several views.

1 indicates an open frame mounted on transfer wheels 2 which are removed when the machine is in operation and drawn by means of draft pole 3, 4 indicating a seat for the operator.

5 indicates blades secured to the rear of frame 1 by means of shanks 6 engaging holes 7 in the frame and secured in place by means of pins or keys 8 engaging said frame and transverse grooves 9 in shanks 6.

The grubbing implements consist of rollers 10 mounted in the frame 1 and comprising disks 11 with cross bars 12 secured thereto and provided with holes 13. Secured in holes 13 are the shanks 14 of cultivator teeth 15 which are held in position by means of transverse pins 16. The teeth 15 have parallel sides $16^a$, the front sides curved forwardly, as shown at 17, and the rear side curved from the base of the tooth and converging with the front side 17 as shown at 18, this construction forming a sharp cutting edge 19 that digs into the soil and as the curved sides 17 of the teeth are uppermost when the teeth leave the soil they lift up any clods, roots, sprouts, etc., that they may encounter, into engagement with blades 5 and effectually break up the clods and cut up the roots and sprouts. The front of each tooth 15 is also grooved longitudinally as shown at 20 to add to the lifting effectiveness of the teeth for the purposes stated.

Because of the sharp cutting edge 19 and the angular edges of the teeth formed by the parallel sides $16^a$ and the curved faces 17 and 18, together with the strength of the teeth and the construction, by which they may be renewed when broken or worn out, my machine is especially adapted to breaking up new land, as the teeth chop up the smaller tree roots and by scarring and breaking away pieces of the large surface roots leave them more easily to be decayed by the moisture in the soil.

Having thus described my invention what I claim is—

1. In a grubbing and root breaking machine, a roller having teeth secured thereto with concaved front surfaces, said front faces being longitudinally grooved.

2. In a grubbing and root breaking machine, a roller having teeth secured thereto with substantially parallel side faces and the other faces curved on converging planes so that the front face is concaved, said front face being longitudinally grooved.

3. In a grubbing and root breaking machine, a frame having blades secured thereto, a roller journaled in the frame, and teeth secured to said roller and arranged to pass between the blades, said teeth having their front surfaces concaved and longitudinally grooved to lift clods and roots into engagement with the blades.

In testimony whereof I hereto affix my signature in the presence of two witnesses.

DAVID M. GATES.

Witnesses:
ANDY SALLEY,
L. H. DAVIS.